United States Patent [19]

von Loewis of Menar et al.

[11] 3,829,166
[45] Aug. 13, 1974

[54] BRAKE CONTROL APPARATUS FOR A MOTOR CAR

[75] Inventors: Alexander von Loewis of Menar, Mauren; Klaus-Otto Riesenberg, Ludwigsburg-Ossweil, both of Germany

[73] Assignee: Robert Bosch GmbH, Stuttgart, Germany

[22] Filed: Feb. 16, 1973

[21] Appl. No.: 333,293

[30] Foreign Application Priority Data
Feb. 22, 1972 Germany............................ 2208185

[52] U.S. Cl.......... 303/21 CG, 188/181 A, 303/10, 303/21 F
[51] Int. Cl............................................. B60t 8/10
[58] Field of Search ............ 303/21, 10; 188/181 A; 310/68, 168

[56] References Cited
UNITED STATES PATENTS

| | | | |
|---|---|---|---|
| 2,753,475 | 7/1956 | Curl | 303/21 CG |
| 3,521,934 | 7/1970 | Leiber | 303/21 F |
| 3,549,212 | 12/1970 | Leiber | 303/21 F |
| 3,550,966 | 12/1970 | Leiber | 303/21 F |
| 3,604,761 | 9/1971 | Okamoto | 303/21 CG |
| 3,698,772 | 10/1972 | Nixon | 303/21 BE |

Primary Examiner—Trygve M. Blix
Assistant Examiner—D. C. Butler
Attorney, Agent, or Firm—Michael S. Striker

[57] ABSTRACT

The brake system of a motor car is controlled by a portion of the drive shaft of the car. The speed of the drive shaft is higher, but proportionate to the speed of the wheel shaft. A pulse generating sensor is operated by the drive shaft portion which is already provided in the motor car, to supply pulses at a frequency which varies with the shaft speed, to an electronic control means which responds in dependence upon the pulses to interrupt communication between the master cylinder and the wheel brake cylinder by operation of an electro-magnetic valve.

12 Claims, 2 Drawing Figures

PATENTED AUG 13 1974 3,829,166

BRAKE CONTROL APPARATUS FOR A MOTOR CAR

BACKGROUND OF THE INVENTION

The present invention relates to a pressure fluid containing brake system with skid protection for the wheels of a motor car and having between the master cylinder and the brake cylinder of the brake system, a brake pressure regulating and controlling device, which is controlled by a sensor connected with the central drive shaft from which the wheels are driven.

Apparatus of this type is described in the German AS No. 1,555,552. In this apparatus, the sensor is driven by a gear laterally engaging a gear of the differential, which has the disadvantage that the sensor drive is not quite accurate.

SUMMARY OF THE INVENTION

It is one object of the invention to overcome this disadvantage of known brake control systems, and to provide a sensor drive which does not require additional gears.

Another object of the invention is to provide a sensor drive which rotates at a high speed so that the function of the sensor is very accurate.

With these objects in view, a part of the sensor is secured to and driven by a shaft which is anyway provided in a standard motor car for driving the wheel shaft, directly or indirectly.

While the rotary part of the sensor, for example, a magnetic gear, is driven by the shaft, the stationary part of the sensor, for example, a winding, is stationarily mounted on a housing which encloses the shaft portion in which the rotary sensor part is located. A radial opening is provided in the housing so that the stationary part of the sensor can project into the region of the rotary part.

In a preferred embodiment of the invention, the stationary pick-up of the sensor is supported in an other housing which is secured to the housing in which the shaft portion and the rotary part of the sensor is located. Preferably, a third housing is attached to the second housing, and contains control apparatus for the brake system, for example, a pump, a pressure accumulator, magnetic control valve means, and electronic control means, while the master cylinder and brake cylinder are connected to the third housing and to respective conduits therein by connector conduit plugs. The control apparatus corrects a condition in which a wheel is locked by high brake pressure.

A compact housing block is formed directly adjacent the sensor which permits easy and quick attachment and removal of the entire apparatus. The plug and socket conduit connectors facilitate repairs and service.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
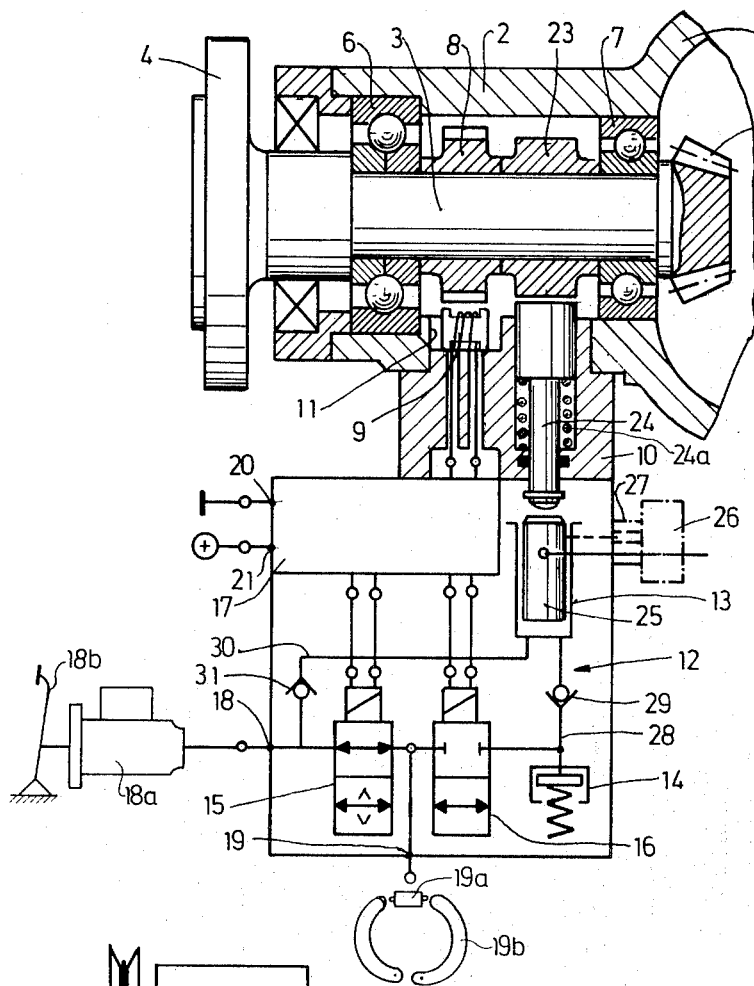
FIG. 1 is partly a sectional view, and partly a schematic diagram illustrating an embodiment of the invention mounted on the housing of the differential transmission of a motor car.

Referring first to FIG. 1, a differential housing 1 has a tubular housing portion 2 through which passes a portion 3 of the drive shaft of the car which is connected with the central drive of the car wheels, namely with the differential of which only one bevel gear 5 is shown in the differential housing 1.

The drive shaft portion 3 is mounted in two roller bearings 6 and 7, and has an end portion projecting out of the housing 2 and carrying a flange 4 to which the output shaft of the main gear transmission of the car is connected.

Between the bearings 6 and 7, a rotary sensor part in the form of a magnetic gear 8, is fixedly secured to shaft portion 3 and is rotated by the same at the speed of the main gear transmission output shaft. The rotary sensor gear 8 cooperates with a stationary sensor pick-up 9 including a winding and being located in housing 2, but carried by housing 10 which is secured to the housing 2. In this manner, the pulse generating sensor 8, 9 is directly operated by a shaft which is part of the standard motor car.

Housing 2 has a radial opening 11 through which the stationary sensor pick-up 9 projects into the region of the rotary sensor gear 8. A third housing block 12 is mounted on the housing 10 and contains apparatus for regulating the brake pressure of the brake 19b of the motor car.

The housing 10 is block-shaped, and contains a cylinder 13 and a piston 25 of a pump, a biassed pressure accumulator 14 connected by a check valve 29 with cylinder 23, two electromagnetic valves 15 and 16, and an electronic control means 17 which is connected with the stationary pick-up means 9 of the pulse generator 8, 9, and receives a voltage at the sockets 20 and 21 by means of a plug. A master cylinder 18a is operated by foot pedal 18b and connected by conduit 18 with the electromagnetic control valve 15 which has two positions between which it is shifted by the control means 17 in accordance with the pulse train received from the sensor 8, 9 which depends on the rotary speed of shaft 3. A second electromagnetic control valve 16 is operated in the same manner.

In the illustrated position, the control valve 15 connects conduit 18 with a conduit 19 which is connected with the wheel brake cylinder 19a so that the brake is actuated by pedal pressure. In the illustrated position, electromagnetic control valve 16 interrupts connection between the brake cylinder 18a and conduit 28 with pressure accumulator 14.

When the control valves are shifted, a throttle conduit in control valve 15 throttles the flow from master cylinder 18a to brake cylinder 19a, while master cylinder 18a is connected by control valve 16 with conduit 28 and the pressure accumulator 14.

Cylinder 13 of the pump 25, 13 is connected by a conduit 30 and a check valve 31 with conduit 18 and with the master cylinder 18a.

Preferably, the conduits 18 and 19 are sockets for the insertion of connector conduits of the master cylinder 18a and the brake cylinder 19a so that the housing 12 of the brake system can be detached and removed from the motor car.

The pump piston 25 is either driven by an electric motor 26 which may be connected by an eccentric member 27 with piston 25, as schematically shown in chain lines. In the preferred embodiment, piston 25 is operated by a cam follower 24 which is mounted in housing 10 for radial movement, and operated by an eccentric cam means 23 secured to shaft portion 3. During rotation of the eccentric cam 23, the cam follower pin 24 performs first a radial outward stroke toward the piston 25 while compressing the spring 24a, and moves then in an opposite stroke when permitted by the shape of the eccentric cam 23.

The above-described apparatus operates as follows:

The drive shaft portion 3 rotates about four times as fast as the wheel shafts which follow the differential located in the housing portion 1. Due to the rapid rotation of drive shaft position 3, sensor 8, 9 operates very accurately, and effects control of the electronic control means 17 at predetermined speeds of drive shaft portion 3. The electronic control means produces control signals which actuate the electromagnetic valves 15 and 16 accordingly.

Superfluous brake fluid in the brake conduits is sucked by pump 13, 25 through conduits 28 and check valve 29 and pumped through conduit 30 and check valve 31 back into the master cylinder 18a. In this manner, it is assured that always sufficient brake fluid is provided.

The housing block 12 secured to housing portion 10 has the advantage that all required connections can be carried out by inserting plugs into sockets of the housing block 12. This permits easy removal of the housing block 10, and facilitates repairs.

The teeth of the sensor gear 8 pass successively the sensor pick-up winding 9 and induce in winding 9 an alternating current of the frequency corresponding to the number of teeth of gear 8. The alternating current at the frequency corresponding to the rotary speed of the drive shaft portion 3, is transmitted to the electronic control means 17, and the frequency of the alternating current is a parameter for the rotary speed of shaft portion 3. The parameter representing the rotary speed is transformed by differentiation into a deceleration signal indicative of the speed reduction of the wheel driven from the central drive shaft portion 3.

When the signal exceeds or drops below predetermined values, the electromagnetic control valves 15 and 16 are shifted. When electromagnetic valve 15 closes, and electromagnetic valve 16 opens, for example, when a wheel is locked by excessive brake pressure, no brake fluid can flow from master cylinder 18a to the wheel brake cylinder 19a, while at the same time, fluid flows out of the wheel brake cylinder 19a through the opened electromagnetic control valve 16 and check valve 29 into the cylinder 13 and urges piston 25 against the cam follower pin 24 which is operated by the eccentric cam 23.

When the piston 25 is in its upper dead center position, which is the lowest position in FIG. 1, the fluid flows out of the wheel brake cylinder 19a into the pressure accumulator 14, while during movement of piston 25 to the lower dead center position, the upper position in the drawing, the piston 25, under the pressure of the pressure accumulator 14, follows the cam follower pin 24. After passing through the lower dead center position, the piston 25 pumps the supplied brake fluid through the check valve 31 to the master cylinder 18a.

Figure 2:
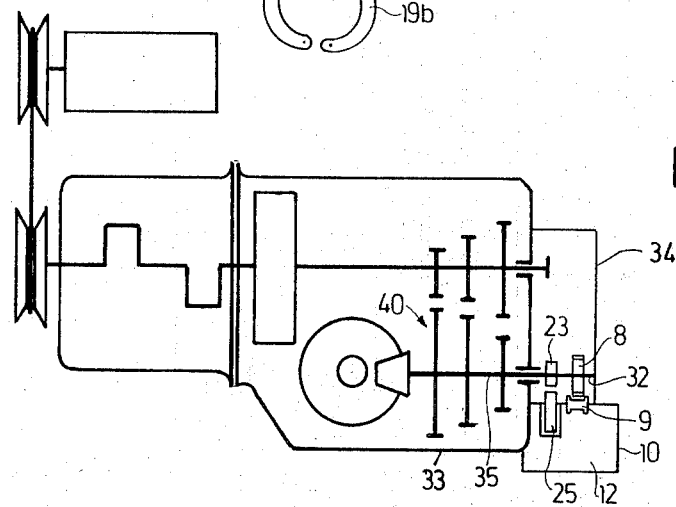
FIG. 2 is a schematic view illustrating a modified embodiment mounted on the transmission gear casing of a motor car.

FIG. 2 illustrates a modified embodiment of the invention which corresponds substantially to the embodiment of FIG. 1, as far as the brake system and its control are concerned, but the housing 34 in which the drive shaft portion 32 is located, and which supports the housing block 12 for the brake control system, is secured to the casing 33 of the main gear transmission 40, instead of the housing 1 of the differential transmission, as described with reference to FIG. 1. The portion 32 of the output shaft 35 of the main transmission 40 carries the magnetic sensor gear 8 which cooperates with the stationary pick-up winding 9, as shown on a larger scale in FIG. 1. Pump piston 25 is operated by the eccentric cam 23 on the shaft portion 32 and connected with the pump piston, as described with reference to FIG. 1.

The comparatively high rotary speed of the shaft portion 32 is used for obtaining very accurate operation of the pulse generating sensor 8, 9.

As in the embodiment of FIG. 1, the brake system is controlled by a standard shaft of the motor car, and the required housings are mounted on a housing which is part of a standar motor car.

It will be understood that each of the elements described above, or two or more together, may also find a useful application in other types of brake control apparatus for a motor car differing from the types described above.

While the invention has been illustrated and described as embodied in a brake control apparatus for a motor car controlled by a portion of the drive shaft of a standard motor car, and secured to a standard housing of the motor car, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A brake control apparatus for a motor car, comprising drive shaft means including a drive shaft portion; housing means for said drive shaft portion; a pulse generating sensor in said housing means including a rotary means carried by said drive shaft portion, and stationary means supported by housing means so that pulses are generated in said stationary means at a frequency depending on the rotary speed of said drive shaft portion; a pressure fluid containing brake system for braking the motor car including a master cylinder, at least one brake cylinder, brake means for the wheels of the car, and control valve means between said master cylinder and said brake cylinder; and control means operative for receiving said pulses and controlling said control valve means in dependence upon said pulses, said housing means including a first housing portion for said drive shaft portion and for said rotary means of said pulse generating sensor and having a radial opening, and a second housing portion supporting said stationary means in a position projecting through said opening toward said rotary means of said pulse generating sensor.

2. Brake control apparatus as claimed in claim 1 comprising a differential transmission driven by said drive shaft portion.

3. Brake control apparatus as claimed in claim 2 wherein said first housing portion includes a portion housing said differential transmission, and a tubular housing portion including two bearings for supporting the ends of said drive shaft portion in said tubular housing portion; wherein said rotary means of said pulse generating sensor is secured to said drive shaft portion between said bearings; wherein said radial opening is formed in said tubular housing portion; and wherein said second housing portion is supported on said tubular housing portion.

4. Brake control apparatus as claimed in claim 1 comprising a main transmission including a transmission housing; wherein said drive shaft means is the output shaft of said main transmission; wherein said housing means is secured to said transmission housing; and wherein said drive shaft portion projects from said transmission housing into said housing means.

5. A brake control apparatus for a motor car, comprising drive shaft means including a drive shaft portion; housing means for said drive shaft portion; a pulse generating sensor in said housing means including a rotary means carried by said drive shaft portion, and stationary means supported by said housing means so that pulses are generated in said stationary means at a frequency depending on the rotary speed of said drive shaft portion; a pressure fluid containing brake system for braking the motor car including a master cylinder, at least one brake cylinder, brake means for the wheels of the car, and control valve means between said master cylinder and said brake cylinder; and control means operative for receiving said pulses and controlling said control valve means in dependence upon said pulses, said housing means including a first housing portion for said drive shaft portion and for said rotary means of said pulse generating sensor and having a radial opening, and a second housing portion supporting said stationary means in a position projecting through said opening toward said rotary means of said pulse generating sensor, wherein said housing means include a first housing portion for said drive shaft portion and for said rotary means of said pulse generating sensor and having a radial opening, a second housing portion supporting said stationary means in a position projecting through said opening toward said rotary means of said pulse generating sensor, and a third housing portion housing said control means, said control valve means, and conduit means for connecting said master cylinder and said brake cylinder with said control valve means.

6. Brake control apparatus as claimed in claim 5 wherein said third housing portion is secured to said second housing portion.

7. Brake control apparatus as claimed in claim 5 wherein said third housing portion has attaching openings connected with said conduit means; and wherein said master cylinder and said brake cylinder have connector conduit pieces for insertion into said attaching openings.

8. Brake control system as claimed in claim 5 wherein said control valve means include electromagnetic means; wherein said control means are electronic means; and wherein said pulse generating sensor generates electric pulses supplied to said electronic control means.

9. Brake control apparatus as claimed in claim 5 further comprising a pump and a pressure accumulator in said third housing portion, said pump pumping into said master cylinder and drawing fluid from said pressure accumulator.

10. Brake control apparatus as claimed in claim 9 wherein said pump includes eccentric means secured to said drive shaft portion, cam follower means engaging said eccentric means and mounted in said second housing portion, a cylinder in said third housing portion, and a piston in said cylinder connected with said cam follower means so as to be reciprocated.

11. Brake control apparatus as claimed in claim 10 wherein said rotary means is a magnetic gear secured to said drive shaft portion; wherein said stationary means includes a winding for generating pulses; and wherein said eccentric means is secured to said drive shaft portion adjacent said magnetic gear.

12. Brake control apparatus as claimed in claim 9 comprising an electro motor mounted on said third housing portion for driving said pump.

* * * * *